United States Patent Office 3,833,639
Patented Sept. 3, 1974

3,833,639
PROCESS FOR PREPARATION OF
UNSATURATED NITRILES
Luciano Moreschini, Franco Marciandi, Guido Petrini, and Franco Faletti, Milan, Italy, assignors to Montecatini Edison S.p.A., Milan, Italy
No Drawing. Filed June 14, 1972, Ser. No. 262,562
Claims priority, application Italy, June 16, 1971, 25,902/71; July 21, 1971, 7,518/71; Sept. 15, 1971, 28,657/71, 28,658/71
Int. Cl. C07c *121/02*
U.S. Cl. 260—465.9
8 Claims

ABSTRACT OF THE DISCLOSURE

Method of preparing alpha-beta-unsaturated nitriles. Comprises reacting, in the gaseous phase, a saturated aldehyde containing from 3 to 8 carbon atoms with oxygen and ammonia in the presence of a catalyst containing (1) tellurium oxide and (2) an oxide of titanium, cerium, or molybdenum, or a mixture of oxides of cerium and molybdenum.

BACKGROUND OF THE INVENTION

1. Field of the Invention

The present invention relates to a process for the preparation of unsaturated nitriles by the catalytic ammoxidation in the vapor phase of low molecular weight saturated aldehydes.

2. Description of the Prior Art

In general, alpha,beta-unsaturated nitriles are produced by reacting an olefin, ammonia and molecular oxygen, in the gaseous phase, at a high temperature, and in the presence of a suitable catalyst. Such method is used industrially, for instance, to produce acrylonitrile from propylene, and to produce methacrylonitrile from isobutene, and has been extensively described in the patent literature.

It is also well known that it is possible to obtain alpha,beta-unsaturated nitriles from the corresponding unsaturated aldehydes, for instance, as described in British Pat. 709,337; Belg. Pat. 628,287; and Japanese Pat. 22,854/68.

Alpha,beta-unsaturated nitriles may also be obtained by dehydrogenation of the corresponding saturated nitriles at very high temperatures, using certain catalysts, e.g., based on elements from Group IB of the Periodic Table, or based on $CrO_3$ and/or $V_2O_5$, or based on Mo or W on $Al_2O_3$, as described, e.g., in U.S. Pat. 2,554,484; German Pat. 1,127,890, and Japanese Pat. 2967/69.

A known technique for producing saturated nitriles is that of ammoxidizing saturated aldehydes, such as, for instance, as described in U.S. Pat. 2,452,187 and 2,525,818, and in German Pat. 1,100,611.

In all these processes there is obtained only one conversion, that is, either the introduction of the double bond in a saturated nitrile, or the formation of the —CN group in an already unsaturated reactant.

It is, however, also possible to obtain alpha, beta-unsaturated nitriles starting from saturated aldehydes in a single step, by means of heterogeneous catalysis, using a catalyst capable of performing both dehydrogenation as well as introduction of the nitrile group in the molecule of the reactant. This is described in U.S. Pats. 2,412,437; 3,365,482; and 3,491,139, wherein there is disclosed the use of catalysts based on chromium sesquioxide, or based on Mo or W oxides on activated alumina, or based on elements from Group VIII, optionally in the presence of co-catalysts based on metals, oxides, nitrates, halides, sulfates or phosphates of elements from Group VIB, taking into account also the introduction of a promoter such as a halogen, halogen hydride, or halogenated hydrocarbon.

SUMMARY OF THE INVENTION

We have found that by using certain specified catalysts it is possible to ammoxidize saturated aldehydes in a highly selective fashion so as to obtain alpha,beta-unsaturated nitriles.

The present invention provides a process for the preparation of an alpha,beta-unsaturated nitrile from a saturated aldehyde containing from 3 to 8 carbon atoms by utilizing oxygen or an oxygen-containing gas and ammonia in the presence of a catalyst containing tellurium oxide and an oxide of either titanium, cerium, molybdenum, or a mixture of oxides of cerium and molybdenum.

DESCRIPTION OF THE PREFERRED EMBODIMENTS

When the catalyst is a mixture of tellurium oxide with titanium or cerium oxide the atomic ratio Te/(Ce or Ti) is from 1:0.1 to 1:5, and preferably from 1:0.2 to 1:2.

Where the catalyst is a mixture of tellurium oxide and molybdenum oxide the atomic ratio Te:Mo is from about 1:25 to 1:0.5, and preferably from 1:12.5 to 1:1.

Where the catalyst contains both molybdenum oxide and cerium oxide the atomic ratios are defined by the formula:

wherein $x$ is a number from 0.2 to 20; $y$ is a number from 0.5 to 20; and $z$ is a number from 1 to 30.

Optimum activity is obtained when:

$x$ is from 0.5 to 15
$y$ is from 1.1 to 10, and
$z$ is from 6.17 to 27.8.

For the preparation of the catalyst there may be utilized various techniques known to the prior art, which processes will lead to appropriate mixtures of oxides of Te, Ce, Ti, and/or Mo. See, e.g., the specific examples hereinafter for illustrations of such techniques.

For instance, it is possible to prepare the catalyst by mixing together an oxide of Te with an oxide of Ce, Ti, or Mo. The mixture thus obtained is then heat-treated in an oxidizing medium.

Alternatively, solutions of soluble compounds such as for instance telluric acid, titanium halides, cerium halides and nitrates, ammonium molybdates, may be mixed together in suitable ratios. The resulting mixture is then dried and activated by heating to high temperatures in an oxidizing medium.

For the preparation of supported catalysts there may be used suitable solutions of the active compounds in hydrogen peroxide and nitric acid.

For those catalysts containing Te and Ti or Ce, whatever their mode of preparation, the activation temperature is from 400° C. to 700° C., and preferably from 450° C. to 650° C.

For those catalysts containing Te and Mo (or Te+Mo +Ce), whatever their mode of preparation, the activation temperature is from 450° C. to 600° C., and preferably is about 500° C.

The catalyst may be used either without a carrier or in the presence of a suitable carrier such as silica, alumina, silica-alumina, carborundum, pumice, etc.

The process of this invention is carried out so that the amount of aldehyde is from 1% to 33% by volume of the overall reaction mixture, with a molar ratio oxygen: aldehyde from about 1:1 and 10:1, with a molar ratio $NH_3$:aldehyde from about 0.8:1 to 8:1, at a temperature of from about 300° to 600° C., and preferably from about 350° to 500° C.

The contact time, defined as the ratio between the apparent volume of the catalyst and the volume of the gas fed in per unit of time, at the reaction conditions, is from 0.01 to 20 seconds, and preferably from 0.1 to 5 seconds.

Particularly suitable starting aldehydes include isobutyraldehyde, n-butyraldehyde, propionaldehyde, as well as other like aldehydes having from 3 to 8 carbon atoms, or mixtures thereof, e.g., obtained as by-products in the chemical and petrol-chemical industry, to thereby obtain, respectively, methacrylonitrile, crotononitrile, acrylonitrile, and the various other corresponding nitriles.

The process may be carried out in any kind of reactor that is suitable for carrying out a heterogeneous catalytic reaction in the gaseous phase. For the purpose there may be used both fixed bed as well as fluidized bed reactors.

The reaction may be conducted either at atmospheric pressure or in excess of atmospheric pressure so as to boost the specific production of nitriles.

The amount of starting aldehyde is preferably from about 2% to 10% by volume with respect to the overall reaction mixture.

The oxygen necessary for the process of ammoxidation of saturated aldehydes may be fed in a 100% pure state, but unless there are special reasons for such concentration, air will be the preferred oxidizing agent.

The molar ratio between the oxygen and the aldehyde is preferably from 1.2:1 to 4:1, while the molar ratio between ammonia and aldehyde is preferably from 1:1 to 6:1.

The ammoxidation is preferably conducted in the presence of one or more diluents such as nitrogen, water vapor, $CO_2$, or the like.

The following examples will further illustrate the invention. All parts are by weight unless otherwise stated.

In these examples the catalysts were tested in fixed bed reactors and the quantitative evaluations of the nitriles that were formed were carried out by gas-chromatographic analysis.

EXAMPLE 1

In this and in the following tests there was used a vertical stainless steel reactor having a 10 mm. inside diameter and a 120 mm. height, provided with a porous terminal section and a centrally arranged sheath for thermocouples. The heating was effected by immersion into a bed of fluidized sand which was electrically heated. The aldehyde feed had previously been vaporized in a nitrogen stream, the flow being regulated through a flowmeter.

Oxygen and ammonia were introduced into the reactor after metering through flowmeters, and were then mixed together with the $N_2$ stream carrying the aldehyde into a reaction zone of the reactor in close proximity to the catalyst.

The reaction products were conveyed towards a sampling valve for gas-chromatographic sampling in the gaseous phase, and from there the products were injected into the gas-chromatograph after the reaction conditions were as desired.

The catalyst was prepared by dissolving 22.96 g. of telluric acid ($H_6TeO_6$) and 21.7 g. of cerium nitrate [$Ce(NO_3)_3 \cdot 6H_2O$] in water. The volume of the solution was then brought up to 84 ml. and this was used to impregnate 76.4 g. of commercial microspheroidal silica. This impregnated material was then dried at 110° C. for 8 hours.

After loading the reactor with 2.5 cc. of the catalyst obtained as previously described (particle size of from 100 to 150 mesh), the temperature was stablized at 440° C., maintaining a contact time of 0.7 seconds, while the feeding molar ratios isobutyraldehyde/$NH_3$/Air/$N_2$ were 1:4:20:22.

From the analysis of the products thus obtained it was possible to ascertain that the yield of methacrylonitrile, "yield" being defined as the ratio $$\frac{\text{g. of C obtained as methacrylonitrole} \times 100}{\text{g. of C fed in as isobutyraldehyde,}}$$

amounted to 35.5%.

EXAMPLE 2

This test was carried out using the same procedures and equipment as described in Example 1. Into the reactor were loaded 2.5 cc. of a catalyst with a particle size of 100–150 mesh, obtained by dissolving 11.5 g. of telluric acid ($H_6TeO_6$) and 21.7 g. of cerium nitrate

[$Ce(NO_3)_3 \cdot 6H_2O$]

in water. The volume of the solution was then brought up to 53 ml. and this was used to impregnate 48.2 g. of commercial microspheroidal silica. The material was then dried in an oven at 110° C. for 12 hours and thereupon activated in air at 620° C. for 8 hours.

Once the catalyst had been loaded into the reactor, the temperature was stabilized at 440° C., maintaining the contact time at 0.75 seconds and the feeding molar ratios isobutyraldehyde/$NH_3$/Air/$N_2$ were 1:4:20:22.

From analysis of the products obtained the yield of methacrylonitrole was 41.8%.

The liquid organic products from the reaction had be following percentage distribution:

| | Percent |
|---|---|
| Methacrolein | 14.7 |
| Acrylonitrile | 2.4 |
| Methacrylonitrile | 76.3 |
| Acetonitrile | 6.6 |
| Isobutyronitrile, isobutyraldehyde and acetone | Small quantities. |

EXAMPLE 3

This test was carried out using the same procedures and equipment as described in Example 1.

Into the reactor were loaded 2.5 cc. of the catalyst described in Example 2, having a particle size of 100–150 mesh.

The temperature in the reactor was stabilized at 460° C., while the contact time was maintained at 0.75 seconds and the feeding molar ratios isobutyraldehyde/$H_2O$/$NH_3$/Air/$N_2$ were 1:3:4:20:22.

Analysis of the products thus obtained showed the percentage distribution of the organic liquid products to be as follows:

| | Percent |
|---|---|
| Acetone | 0.7 |
| Methacrolein | 24.7 |
| Acrylonitrile | 2.0 |
| Methacrylonitrile | 62.5 |
| Acetonitrile | 4.9 |
| Isobutyraldehyde | 0.6 |
| Isobutyronitrile | 1.6 |

EXAMPLE 4

This test was carried out using the same procedures and equipment as described in Example 1.

Into the reactor were loaded 2.5 cc. of the catalyst described in Example 2 and having a particle size of from 100 to 150 mesh. The temperature was stabilized at 460° C., with a contact time of 1.5 seconds and with feeding ratios of isobutyraldehyde/$H_2O$/$NH_3$/Air/$N_2$ were 1:1:4:20:22.

From the analysis of the products obtained it was found that the yield in methacrylonitrile was to 30.8%.

EXAMPLE 5

This test was carried out using the same procedures and equipment as described in Example 1.

Into the reactor were loaded 2.5 cc. of the catalyst (sized to 100 to 150 mesh), the catalyst having been obtained by dissolving 34.4 g. of telluric acid ($H_6TeO_6$) and 21.7 g. of cerium nitrate [$Ce(NO_3)_3 \cdot 6H_2O$] in water. The volume was then brought up to 103 ml. and this solution was used to impregnate 97.5 g. of commercial microspheroidal silica. The impregnated material was then dried in an oven at 100° C. for 12 hours and then was activated in air for 8 hours at 620° C.

Thereupon the temperature in the reactor was stabilized at 400° C. and the contact time was maintained at 1.0 seconds. The feeding ratios isobutyraldehyde/$NH_3$/Air/$N_2$ were 1:4:20:22.

Analysis of the products thus obtained showed the yield of methacrylonitrile to be 31.1%.

EXAMPLE 6

The test was carried out using the same technique and equipment as described in Example 1.

The catalyst was prepared by pouring into a porcelain capsule 232 ml. of a commercial (15%) solution of titaniumtrichloride ($TiCl_3$) and by slowly adding, with simultaneous stirring, 45 ml. of $HNO_3$ (65%) and then 51.3 g. of telluric acid ($H_6TeO_6$).

After having slowly brought the mixture to dryness, the residue was dried at 150° C. for 12 hours and was then activated in air at 550° C. for 12 hours. The atomic ratio Te:Ti, in the catalyst thus obtained was 1:0.9.

After loading into the reactor 2.5 cc. of the catalyst obtained as described above (having a particle size between 100 and 150 mesh), the temperature was stabilized at 440° C., while the contact time was maintained at 1 second and the molar feeding ratios isobutyraldehyde/$NH_3$/Air/$N_2$ being 1:4:12:30.

From analysis of the products obtained, the yield of methacrylonitrile was 47.2%.

EXAMPLE 7

This test was carried out using the same procedures and equipment as described in Example 1.

Into the reactor were loaded 2.5 cc. of a catalyst having a particle size between 100 and 150 mesh, and obtained by pouring into a porcelain capsule 135.5 ml. of a commercial solution (15%) of titaniumtrichloride ($TiCl_3$), and then slowly adding under stirring 20 ml. of $HNO_3$ (65%), and finally adding 68.5 g. of telluric acid ($H_6TeO_6$).

After the mixture had been slowly brought to dryness, the residue was dried at 150° C. for 12 hours and was then activated at 550° C. for a further 12 hours. The atomic ratio Te:Ti in the catalyst thus obtained was 1:0.5. After loading the catalyst into the reactor the temperature was stabilized at 440° C., while the contact time was maintained at 1.5 seconds and the molar feeding ratios isobutyraldehyde/$NH_3$/Air/$N_2$ were 1:4:20:22.

From analysis of the products thereby obtained, the yield of methacrylonitrile was 37.9%.

EXAMPLE 8

This test was carried out using the same procedures and equipment as described in Example 1.

Into the reactor were loaded 2.5 cc. of a catalyst having a particle size between 100 and 150 mesh, and obtained by pouring into a porcelain capsule 103 ml. of a commercial solution (15%) of titaniumtrichloride ($TiCl_3$) and then slowly adding, under stirring, 20 ml. of $HNO_3$ (65%) and then 68.5 g. of telluric acid ($H_6TeO_6$).

After having slowly brought the mixture to dryness, the residue was dried at 150° C. for 12 hours and then activated in air at 550° for 8 hours. The atomic ratio Te:Ti in the catalyst thus obtained was 1:0.3. After having loaded the catalyst into the reactor, the reaction temperature was stabilized at 460° C. while the contact time was maintained at 0.75 seconds and the molar feeding ratios isobutyraldehyde/$NH_3$/Air/$N_2$, corresponded to 1:2:20:22.

From analysis of the products obtained it was found that the yield of methacrylonitrile was 41.6%.

EXAMPLE 9

Into the reactor were loaded 2.5 cc. of the catalyst of Example 8 and, operating according to the same technique and equipment as described in Example 1, the reaction temperature was stabilized at 485° C., while the contact time was maintained at 0.75 seconds and the molar feeding ratios of isobutyraldehyde/$NH_3$/Air/$N_3$ corresponded to 1:2:20:22.

From analysis of the products obtained, the yield of methacrylonitrile was 36.5%.

EXAMPLE 10

This test was carried out using the same procedures and equipment as described in Example 1.

Into the reactor were loaded 2.5 cc. of a catalyst having a particle size between 100 and 150 mesh, and obtained by slowly oxidizing 232 ml. of a commercial (15%) solution of titaniumtrichloride ($TiCl_3$) with 45 ml. of $HNO_3$ (65%), and then admixing telluric acid ($H_6TeO_6$). The thus resulting solution was concentrated up to a volume of 162 ml. and this was used to impregnate 154.5 g. of commercial microspherical silica. The solid thus obtained was dried for 12 hours at 150° C. and then activated for 8 hours at 600° C. in air. The atomic ratio Te:Ti in the catalyst was 1:0.9.

After having loaded the catalyst into the reactor, the reaction temperature was stabilized at 440° C., while the contact time was maintained at 0.75 seconds and the molar feeding ratios isobutyraldehyde/$NH_3$/Air/$N_2$ corresponded to 1:2:20:22.

From analysis of the products thus obtained it was possible to establish that the distribution of the liquid organic products was as follows:

| | Percent |
|---|---|
| Methacrolein | 31.8 |
| Acrylonitrile | 2.7 |
| Acetonitrile | 6.9 |
| Methacrylonitrile | 58.5 |

Isobutyraldehyde, acetone and isobutyronitrile were present in small quantities.

EXAMPLE 11

The test was carried out using the same procedures and equipment as described in Example 1.

The catalyst was prepared by dissolving 21.4 g. of ammonium para-molybdate [$(NH_4)_6Mo_7O_{24} \cdot 4H_2O$] in 10 ml. of water and 10 ml. of hydrogen peroxide (35%) and by then adding to this solution 6.9 g. of telluric acid ($H_6TeO_6$) and 5 ml. of 65% $HNO_3$. The resulting liquid was diluted with water up to a volume of 55 ml. and the solution thus obtained was used to impregnate 68.5 g. of commercial spherodial alumina.

This product was then dried for 12 hours at 110° C. and then activated in air for 8 hours at 500° C. The atomic ratio Te:Mo in the catalyst thus obtained was 1:4.

2.5 cc. of the catalyst obtained as described above and having a particle size between 100 and 150 mesh was loaded into the reactor. The temperature was then stabilized at 420° C. while the contact time was fixed at 0.25 seconds, the molar feeding ratios of isobutyraldehyde/$NH_3$/Air/$N_2$ were 1:2:20:22.

From analysis of the products thus obtained the yield of methacrylonitrile was 32.4%.

EXAMPLE 12

The test was carried out using the same technique and equipment as described in Example 1.

Into the reactor were loaded 2.5 cc. of a catalyst with a particle size between 100 and 150 mesh, and obtained by dissolving 42.8 g. of ammonium para-molybdate in 20 ml. of water and 20 ml. of hydrogen peroxide (33%) adding to this solution 9.18 g. of telluric acid and 10 ml. of $HNO_3$(65%).

The solution thus obtained was slowly brought to dryness under constant stirring. The residue was then dried for 12 hours at 110° C. and then activated for 8 hours in air at 500° C. The atomic ratio Te:Mo in the catalyst thus obtained was 1:6.

After loading the catalyst into the reactor, the temperature in the reactor was stabilized at 500° C., while the contact time was fixed in 0.4 seconds and the molar feeding ratios of isobutyraldehyde/NH$_3$/Air/N$_2$ were 1:4:20:22.

From analysis of the products obtained, the yield of methacrylonitrile was 40.8%.

EXAMPLE 13

This test was carried out using the same technique and equipment as described in Example 1.

Into the reactor were loaded 2.5 cc. of catalyst having a particle size between 100 and 150 mesh, and which was obtained by dissolving 21.4 g. of ammonium para-molybdate [(NH$_4$)$_6$Mo$_7$O$_{24}$·4H$_2$O] in 10 ml. of water and 10 ml. of hydrogen peroxide (35), and by then adding to this solution 6.9 g. of telluric acid (H$_6$TeO$_6$) and 5 ml. of HNO$_3$(65%). The resulting liquid was then diluted with water to reach a volume of 75 ml. With the solution thus obtained were impregnated 68.5 g. of commercial microspherodial silica. The product was then dried for 12 hours at 110° C. and then activated for a further 8 hours in air at 500° C. The atomic ratio Te:Mo in the catalyst was 1:4.

After loading into the reactor 2.5 cc. of the catalyst obtained as described above and having a particle size of between 100 and 150 mesh, the temperature in the reactor was stabilized at 460° C., while the contact time was established at 0.75 seconds and the molar feeding ratios isobutyraldehyde/NH$_3$/Air/N$_2$ were maintained at 1:4:20:22.

From analysis of the products thus obtained, the distribution of the liquid organic products was:

|  | Percent |
| --- | --- |
| Acrylonitrile | 2.0 |
| Methacrylonitrile | 36.7 |
| Acetonitrile | 54.6 |
| Isobutyronitrile | 6.6 |

Isobutyraldehyde, acetone and methacrolein were present only in small quantities.

EXAMPLE 14

This test was carried out using the same technique and equipment as described in Example 1.

Into the reactor were loaded 2.5 cc. of a catalyst with a particle size between 100 and 150 mesh, obtained by dissolving 42.8 g. of ammonium para-molybdate

in 20 ml. of water and 20 ml. of hydrogen peroxide at 35%, and by then adding to this solution 18.36 g. of telluric acid (H$_6$TeO$_6$) and 10 ml. of HNO$_3$ (65%).

The solution thus obtained was then brought slowly to dryness under constant stirring. Thereupon the residue was dried for 12 hours at 110° C. and then activated for 8 hours in air at 500° C. The atomic ration Te:Mo in the catalysts was 1:3.

Once the catalyst was loaded into the reactor, the temperature was stabilized at 480° C., while the contact time was set at 1.5 seconds and the molar feeding ratios isobutyraldehyde/NH$_3$/Air/N$_2$ where maintained at 1:4:20:22.

From analysis of the products obtained, the yield of methacrylonitrile was 34.3%.

EXAMPLE 15

This test was carried out using the same procedures and equipment as described in Example 1. Into the reactor were loaded 2.5 cc. of a catalyst with a particle size of between 100 and 150 mesh, obtained by dissolving 42.8 g. of ammonium para-molybdate [(NH$_4$)$_6$Mo$_7$O$_{24}$·4H$_2$O] in 30 ml. of water and 30 ml. of hydrogen peroxide (35%), and by then adding to this solution 27.52 g. of telluric acid (H$_6$TeO$_6$) and 10 ml. of HNO$_3$ (65%). The solution thus obtained was then slowly brought to dryness under constant stirring and the residue was dried for 12 hours at 100° C. and then activated in air at 500° C. for 8 hours. The atomic ratio Te:Mo in the catalyst was 1:2.

The catalyst was loaded into the reactor, the temperature was stabilized at 480° C., and the contact time was set at 1.5 seconds and the molar feeding ratios isobutyraldehyde/NH$_3$/Air/N$_2$ were maistained at 1:3:20:22.

Analysis of the products obtained showed the distribution of the liquid organic products to be as follows:

|  | Percent |
| --- | --- |
| Acrylonitrile | 1.1 |
| Methacrolein | 10.5 |
| Methacrylonitrile | 46.0 |
| Acetonitrile | 24.8 |
| Isobutyronitrile | 17.5 |

The test was carried out using the same technique and equipment as described in Example 1.

The catalyst was prepared by dissolving 115.2 g. of ammonium para-molybdate

in 140 mm. of water at 60° C. and by then pouring the solution thus obtained into another solution under stirring, this latter solution consisting of 118.2 g. of cerium nitrate [Ce(NO$_3$)$_3$·6H$_2$O] and of 48.96 g. of telluric acid (H$_6$TeO$_6$) in 200 ml. of water at 60° C.

The slurry thus obtained was acidified with 43 ml. of HNO$_3$ (65%) and was brought slowly to dryness. The residue was then dried for 12 hours at 150° C. and then was activated in air for 8 hours at 500° C. the atomic ratios Te:Ce:Mo in the catalyst thus obtained correspond to the empirical formula Te$_4$Ce$_5$Mo$_{12}$.

2.5 cc. of the catalyst, obtained as described above and having a particle size of between 100 and 150 mesh, were loaded into the reactor, the temperature was stabilized at 440° C., the contact time was fixed at 1 second, and the molar feeding ratios were established, isobutyraldehyde/NH$_3$/Air/N$_2$ equal to 1:2:20:22.

Analysis of the products thus obtained showed the yields of methacrylonitrile to be 38.7%.

EXAMPLE 17

Into the reactor were loaded 2.5 cc. of the catalyst of Example 16 and, by operating with the same technique and using the same equipment as described in Example 1, the temperature was stabilized at 460° C. while maintaining the contact time at 1 second and the molar feeding ratios isobutyraldehyde/NH$_3$/Air/N$_2$ at 1:4:20:22.

Analysis of the products obtained showed the yield of methacrylonitrile to be 43.2%.

EXAMPLE 18

This test was carried out using the same procedure and equipment as described in Example 1.

The reactor was first loaded with 2.5 cc. of a catalyst with a particle size of between 100 and 150 mesh, obtained by dissolving 115.2 g. of ammonium para-molybdate

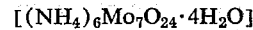

in 140 ml. of water at 60° C., and by then pouring the solution thus obtained into another solution under stirring, the latter solution consisting of 189 g. of cerium nitrate

[Ce(NO$_3$)$_3$·6H$_2$O]

and of 48.96 g. of telluric acid (H$_6$TeO$_6$) in 250 ml. of water at 60° C.

The slurry thus obtained was then acidified with 43 ml. of HNO$_3$ (65%) and was then slowly brought to dryness.

The residue was then dried for 12 hours at 150° C. and thereupon was activated in air for 8 hours at 530° C. The empirical formula of the catalyst was $Te_4Ce_8Mo_{12}$.

After loading the catalyst into the reactor, the temperature was stabilized at 450° C., while the contact time was set at 1.5 seconds and the molar feeding ratio isobutyraldehyde/$NH_3$/Air/$N_2$ corresponded to 1:2:20:22.

Analysis of the products obtained showed the yield of methacrylonitrile to be 33.3%.

EXAMPLE 19

In this test the reactor was loaded with 2.5 cc. of the catalyst of Example 18 and, by operating according to the procedures and equipment as described in Example 1, the temperature of the reactor was stabilized at 420° C., the contact time was established at 1.5 seconds, and the molar feeding ratios isobutyraldehyde/$NH_3$/Air/$N_2$ were set at 1:3:20:22.

Analysis of the products obtained showed the yield of methacrylonitrile to be 37.2%.

EXAMPLE 20

This test was carried out using the same technique and equipment as described in Example 1.

Into the reactor were loaded 2.5 g. of a catalyst having a particle size of between 100 and 150 mesh, obtained by dissolving 115.2 g. of ammonium para-molybdate $$[(NH_4)_6Mo_7O_{24} \cdot 4H_2O]$$

in 140 ml. of water at 60° C., and by then pouring the solution thus obtained into another solution under stirring, this latter solution consisting of 23.3 g. of cerium nitrate $$[Ce(NO_3)_3 \cdot 6H_2O]$$

and of 14.7 g. of telluric acid ($H_6TeO_6$) in 50 ml. of water at 60° C.

The slurry thus obtained was acidified with 43 ml. of $HNO_3$ (65%) and then slowly brought to dryness. The residue was then dried for 12 hours at 150° C. and finally activated for 8 hours at 480° C. in air. The empirical formula of the catalyst was $Te_{12}Ce_1Mo_{12}$.

After loading the catalyst into the reactor, the temperature was stabilized at 470° C., while the contact time was maintained at 0.75 seconds and the molar feeding ratios isobutyraldehyde/$NH_3$/Air/$N_2$ were set at 1:2:20:22.

Analysis of the products obtained showed the distribution of the liquid organic products to be as follows:

| | Percent |
|---|---|
| Acrylonitrile | 2.6 |
| Methacrylonitrile | 48.0 |
| Acetonitrile | 46.0 |
| Isobutyronitrile | 3.3 | while isobutyraldehyde, acetone and methacrolein were present only in small quantities.

EXAMPLE 21

The test was carried out using the same techniques and equipment as described in Example 1.

Into the reactor were loaded 2.5 g. of a catalyst having a particle size of between 100 and 150 mesh, and obtained by dissolving 115.2 g. of ammonium para-molybdate $$[(NH_4)_6Mo_7O_{24} \cdot 4H_2O]$$

in 140 ml. of water at 60° C. and by then pouring the solution thus obtained into another solution under stirring, this latter solution consisting of 151.5 g. of cerium nitrate $$[Ce(NO_3)_3 \cdot 6H_2O]$$

and of 14.7 g. of telluric acid ($H_6TeO_6$) in 200 ml. of water at 60° C.

The slurry was acidified with 43 ml. of $HNO_3$ (65%) and was then slowly brought to dryness. The residue was then dried for 12 hours at 150° C. and then was activated for 8 hours in air at 540° C. The empirical formula of the catalyst was $Te_{12}Ce_7Mo_{12}$.

After loading the reactor with the catalyst, the temperature in the reactor was stabilized at 480° C., the contact time was maintained at 1 second and the molar feeding ratios isobutyraldehyde/$NH_3$/Air/$N_2$ were set at 1:4:20:22.

Analysis of the products obtained showed the yield of methacrylonitrile to be 27.9%.

EXAMPLE 22

The test was carried out using the same techniques and equipment as described in Example 1.

Into the reactor were loaded 2.5 cc. of a catalyst having a particle size of between 100 and 150 mesh, obtained by dissolving 115.2 g. of ammonium para-molybdate $$[(NH_4)_6Mo_7O_{24} \cdot 4H_2O]$$

in 42 ml. of hydrogen peroxide (35%) and in 42 ml. of water, and by then rapidly cooling down to room temperature the resulting solution (solution 1). Separately, 118.2 g. of cerium nitrate [$Ce(NO_3)_3 \cdot 6H_2O$] and 48.96 g. of telluric acid ($H_6TeO_6$) were dissolved in 150 ml. of water and 43 ml. of nitric acid (65%), (solution 2). At this point, solution 1 was admixed with solution 2 and the mixture was diluted with water until a total volume of 580 ml. was attained.

The resulting solution was used to impregnate 523 g. of commercial microspheroidal silica under stirring. The product was then permitted to stand for several hours. Thereafter, it was dried for 12 hours at 110° C. and then activated for another 8 hours in air at 500° C. The empirical formula of the catalyst was $Te_4Ce_5Mo_{12}$.

The reactor was then loaded with the catalyst, the temperature was stabilized at 440° C., the contact time was maintained at 0.4 seconds, and the molar feeding ratios isobutyraldehyde/$NH_3$/Air/$N_2$ were fixed at 1:2:20:22.

Analysis of the products obtained showed the yield of methacrylonitrile to be 36.9%.

EXAMPLE 23

In this test, the reactor was loaded with 2.5 cc. of the catalyst of Example 22 and, by operating according to the same technique and with the same equipment as described in Example 1, the temperature in the reactor was stabilized at 460° C., with a contact time set at 0.25 seconds and with molar feeding ratios isobutyraldehyde/$NH_3$/Air/$N_2$ fixed at 1:4:20:22.

Analysis of the products obtained showed the yield of methacrylonitrile to be 44.0%.

Variations can, of course, be made without departing from the spirit of the invention.

Having thus described the invention, what is desired to be secured by Letters Patent and hereby claimed is:

1. In a method of preparing an ethylenically unsaturated alpha,beta-nitrile, this method comprising reacting in the gaseous phase a saturated acyclic aldehyde containing from 3 to 8 carbon atoms with molecular oxygen and ammonia, said reaction being carried out in the presence of a catalyst selected from the group consisting of a mixture of tellurium oxide and titanium oxide wherein the atomic ratio of Te/Ti is from 1:0.1 to 1:5, a mixture of tellurium oxide with cerium oxide wherein the atomic ratio of Te/Ce is from 1:0.1 to 1:5, a mixture of tellurium oxide and molybdenum oxide wherein the atomic ratio of Te/Mo is from 1:25 to 1:05, and a mixture of tellurium oxide, cerium oxide and molybdenum oxide wherein the atomic ratios between tellurium, cerium and molybdenum are defined by the formula $Te_xCe_yMo_z$, wherein $x$ is from 0.2 to 20, $y$ is from 0.5 to 20, and $z$ is from 1 to 30; said reaction being carried out at a temperature of from about 300° C. to 600° C., with the molar ratio of oxygen:aldehyde being from about 1 to 10 and the molar ratio of $NH_3$:aldehyde being from about 0.8 to 8.

2. The method of claim 1 wherein said catalyst is supported on a catalyst support.

3. The method of claim 1 wherein said support is silica, alumina, silica-alumina, carborundum, or pumice.

4. The method of claim 1 wherein the saturated aldehyde is isobutyraldehyde and the resulting unsaturated alpha-beta-nitrile is methacrylonitrile.

5. The method of claim 1 wherein the gaseous mixture of reactants is diluted with nitrogen, water vapor, $CO_2$, or mixtures thereof.

6. The method of claim 1 wherein the aldehyde is present in the gaseous reaction mixture in an amount of from about 2% to 10% by volume.

7. The method of claim 1 wherein the temperature is from about 350° C. to 500° C.

8. The method of claim 1 wherin the molar ratio of $NH_3$:aldehyde in the reaction mixture is from about 1 to 6, and the molar ratio of $O_2$:aldehyde is from about 1.2 to 4.

References Cited
UNITED STATES PATENTS

| | | | |
|---|---|---|---|
| 2,412,437 | 12/1946 | Wagner | 260—465.9 |
| 2,691,037 | 10/1954 | Bellringer et al. | 260—465.9 |
| 2,786,867 | 3/1957 | Hagemeyer, Jr. et al. | 260—465.9 X |
| 3,179,694 | 4/1965 | Van Eygen et al. | 260—465.9 |
| 3,309,325 | 3/1967 | Gasson et al. | 260—465.9 X |
| 3,365,482 | 1/1968 | Khoobiar | 260—465.9 X |
| 3,491,139 | 1/1970 | Biale | 260—465.9 |

JOSEPH P. BRUST, Primary Examiner

U.S. Cl. X.R.

260—593 R, 601 R